United States Patent
D'Oracio De Almeida et al.

(10) Patent No.: US 11,152,770 B2
(45) Date of Patent: Oct. 19, 2021

(54) POWER DISTRIBUTION AND PROTECTION CABINET

(71) Applicant: BRAND SHARED SERVICES, LLC, Kennesaw, GA (US)

(72) Inventors: Eduardo Fernando D'Oracio De Almeida, League City, TX (US); Amrith Singh Thakur, Houston, TX (US)

(73) Assignee: BRAND SHARED SERVICES LLC, Kennesaw, GA (US)

( * ) Notice: Subject to any disclaimer, the term of this patent is extended or adjusted under 35 U.S.C. 154(b) by 169 days.

(21) Appl. No.: 16/535,435

(22) Filed: Aug. 8, 2019

(65) Prior Publication Data
US 2020/0052481 A1    Feb. 13, 2020

Related U.S. Application Data

(60) Provisional application No. 62/715,898, filed on Aug. 8, 2018.

(51) Int. Cl.
*H02B 1/30* (2006.01)
*H02B 1/52* (2006.01)
(Continued)

(52) U.S. Cl.
CPC .......... *H02B 1/52* (2013.01); *H02B 1/04* (2013.01); *H02B 1/28* (2013.01); *H02B 1/305* (2013.01); *H02H 7/22* (2013.01)

(58) Field of Classification Search
CPC .......... H02B 1/04; H02B 1/305; H02B 1/52; H02H 7/22
See application file for complete search history.

(56) References Cited

U.S. PATENT DOCUMENTS

| 2,995,670 A | * | 8/1961 | Weiss | H02B 1/52 307/112 |
| 3,786,312 A | * | 1/1974 | Roussard | H02B 1/52 361/643 |

(Continued)

FOREIGN PATENT DOCUMENTS

| CA | 2146511 A1 | * | 10/1996 | .......... H02B 1/18 |
| CN | 104426079 A | * | 3/2015 | |
| GB | 1597268 A | * | 9/1981 | .......... H02B 1/52 |

OTHER PUBLICATIONS

NCB Series Circuit Breakers and Enclosures, 2013.
Eaton Heavy Duty Single-Throw Non-Fused Safety Switch DH364URK, 2016.

*Primary Examiner* — Robert J Hoffberg
(74) *Attorney, Agent, or Firm* — Gardner Groff & Greenwald, PC

(57) ABSTRACT

An enclosure, one input cable and multiple output cables extending through the enclosure, a plurality of circuit breakers and ground-fault circuit interrupters in the enclosure and electrically connected to respective ones of the output cables, and a junction in the enclosure to which the input cable is electrically connected and to which the circuit breakers and ground-fault circuit interrupters are electrically connected. The output cables each include a connector for connection to an electric-powered machine, so that multiple of the machines can be powered and protected by a single power cabinet with a single power-supply connection.

20 Claims, 3 Drawing Sheets

(51) Int. Cl.
    *H02B 1/28*     (2006.01)
    *H02H 7/22*     (2006.01)
    *H02B 1/04*     (2006.01)

(56) References Cited

U.S. PATENT DOCUMENTS

| | | | | |
|---|---|---|---|---|
| 4,318,156 | A * | 3/1982 | Gallagher | H02B 1/52 307/147 |
| 5,070,429 | A * | 12/1991 | Skirpan | H02B 1/305 361/644 |
| 5,202,538 | A * | 4/1993 | Skirpan | H02B 1/305 174/661 |
| 5,486,664 | A * | 1/1996 | Lamp | H01R 13/52 200/297 |
| 5,574,622 | A * | 11/1996 | Brown | F02B 63/04 307/150 |
| 9,983,615 | B2 * | 5/2018 | Drueke | H02H 7/228 |
| 10,158,213 | B2 * | 12/2018 | Burch | H02B 11/26 |
| 10,236,681 | B2 * | 3/2019 | Thrush | H01H 83/04 |
| 10,727,653 | B2 * | 7/2020 | Burch | H02B 7/06 |
| 2008/0253061 | A1 * | 10/2008 | Seff | H02B 1/50 361/622 |
| 2017/0125984 | A1 * | 5/2017 | Mergener | H02B 1/52 |
| 2017/0179691 | A1 * | 6/2017 | Easton | H02B 1/50 |
| 2019/0181767 | A1 | 6/2019 | Sagona | |

* cited by examiner

POWER DISTRIBUTION AND PROTECTION CABINET

CROSS-REFERENCE TO RELATED APPLICATION

This application claims the priority benefit of U.S. Provisional Patent Application Ser. No. 62/715,898 filed Aug. 8, 2018, which is hereby incorporated herein by reference.

TECHNICAL FIELD

The present invention relates generally to the field of electric power equipment, and more particularly to such equipment for delivering power to and protecting heavy-duty industrial construction and maintenance equipment used in a remote location on a temporary basis.

BACKGROUND

Heavy-duty equipment is used for a range of different types of installation, maintenance, and repair work for industrial facilities in remote locations. For example, industrial-voltage (e.g., 277/480 VAC) three-phase hydro-blasting equipment, welding equipment, and other equipment is often used in remote applications for work on gas storage tanks. There is often a limited availability of electric power from the electric grid in such remote locations, so portable three-phase power supplies/generators are often used, and it's important that the expensive heavy-duty machines are protected from irregularities in the power supplied. In particular, each individual machine needs a circuit breaker (CB) to protect it from inrush current and/or over-voltage/current that may occur during operation due to unexpected power fluctuations. And each individual machine needs a ground-fault circuit interrupter (GFCI) to shut down the power supply to the machine in case of a current leakage to an external component.

Currently, each machine is hooked to an individual power box for protection, with each power box including its own CB and GFCI. Typically, two or three machines are required for a job, so two or three power boxes are needed for each job, and each power box must be connected individually to the power source, thereby requiring much cost for all the boxes and power cables and much time to install them all. Also, in the event of an emergency, it can be rather difficult and time-consuming to figure out the correct circuit breaker to shut down.

Accordingly, it can be seen that needs exist for improvements in power boxes for heavy-duty industrial equipment especially for use in remote locations. It is to the provision of solutions to this and other problems that the present invention is primarily directed.

SUMMARY

Generally described, the present invention relates to a power distribution and protection cabinet for use with a power source and multiple electric-powered machines. In typical embodiments, the power cabinet includes an outdoor enclosure, an input cable, a junction, a plurality of circuit breakers, a plurality of ground-fault circuit interrupters, and a plurality of output cables. The input cable provides for electrical connection to the power supply and extends through a sealed opening in the enclosure. The junction is located inside the enclosure and has an internal end of the input cable electrically connected to it. The circuit breakers and ground-fault circuit interrupters are located inside the enclosure and are electrically connected to the junction in serial pairs. Each output cable is electrically connected to a respective one of the CBs and GFCIs at its internal end, extends through a respective sealed opening in the enclosure, and includes a respective external connector at its external end for electrical connection to one of the machines. And the enclosure is mounted to a portable outdoor wheeled cart for use outdoors on uneven terrain.

In this way, the single enclosure houses all of the distribution and protection components for operating the multiple machines at the same time, the single input cable connects to the power source for delivering power to the multiple machines being used at the same time, the junction receives power from the single input cable and distributes that power for use by the multiple machines at the same time, the multiple CBs and GCIs in the single enclosure protect the multiple machines being used at the same time, and the multiple output cables deliver the distributed power to the multiple machines.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

Generally described, the present invention relates to an industrial-voltage power distribution and protection cabinet for use with a power source and multiple units of electric-powered equipment so that each of the electrical machines can be used at the same time. Typically, the power source is a three-phase industrial-voltage (e.g., 277/480/600 VAC) portable generator, though other types and ratings of power sources can be used. Typically, the industrial-voltage three-phase electrical equipment used with the cabinet is hydro-blasting, welding, dust-collector, fast-blaster, and/or other industrial construction and maintenance equipment (e.g., with 60 A of peak load), though other types and ratings of power equipment can be used. And typically the cabinet is used with these pieces of heavy equipment at remote industrial locations where there is no electric power (e.g., gas storage tank sites) and/or at construction sites for industrial locations before temporary power is available (e.g., for site-preparation or other preconstruction work).

Figure 1:
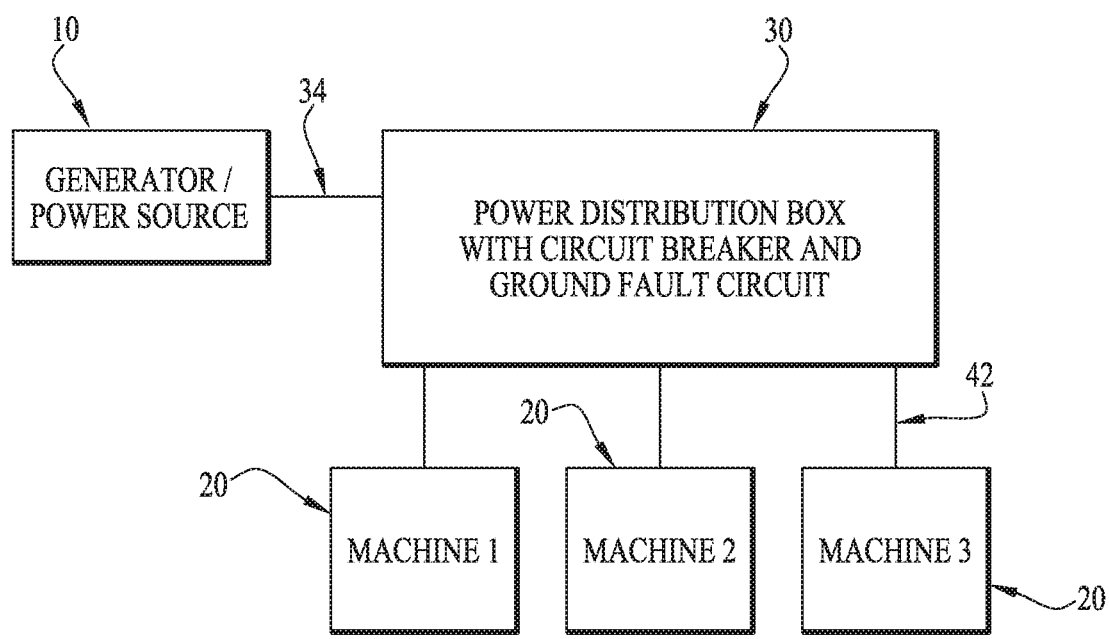
FIG. 1 is a block diagram of an industrial-voltage power distribution and protection cabinet, according to an example embodiment of the invention, in use with a power supply and multiple electric-powered machines.
Figure 2:
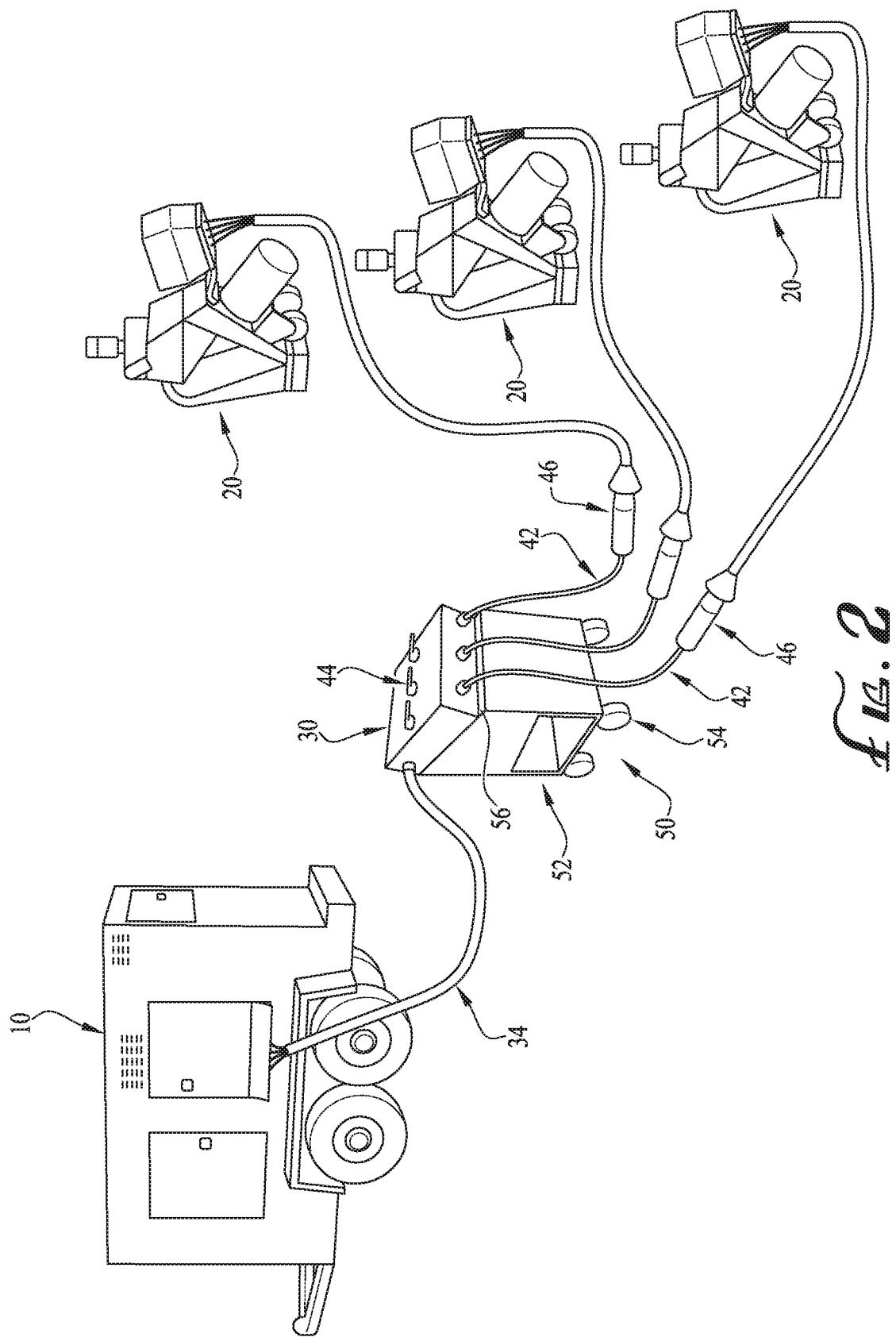
FIG. 2 is a perspective view of the power cabinet, the power supply, and one of the machines of FIG. 1.
Figure 3:
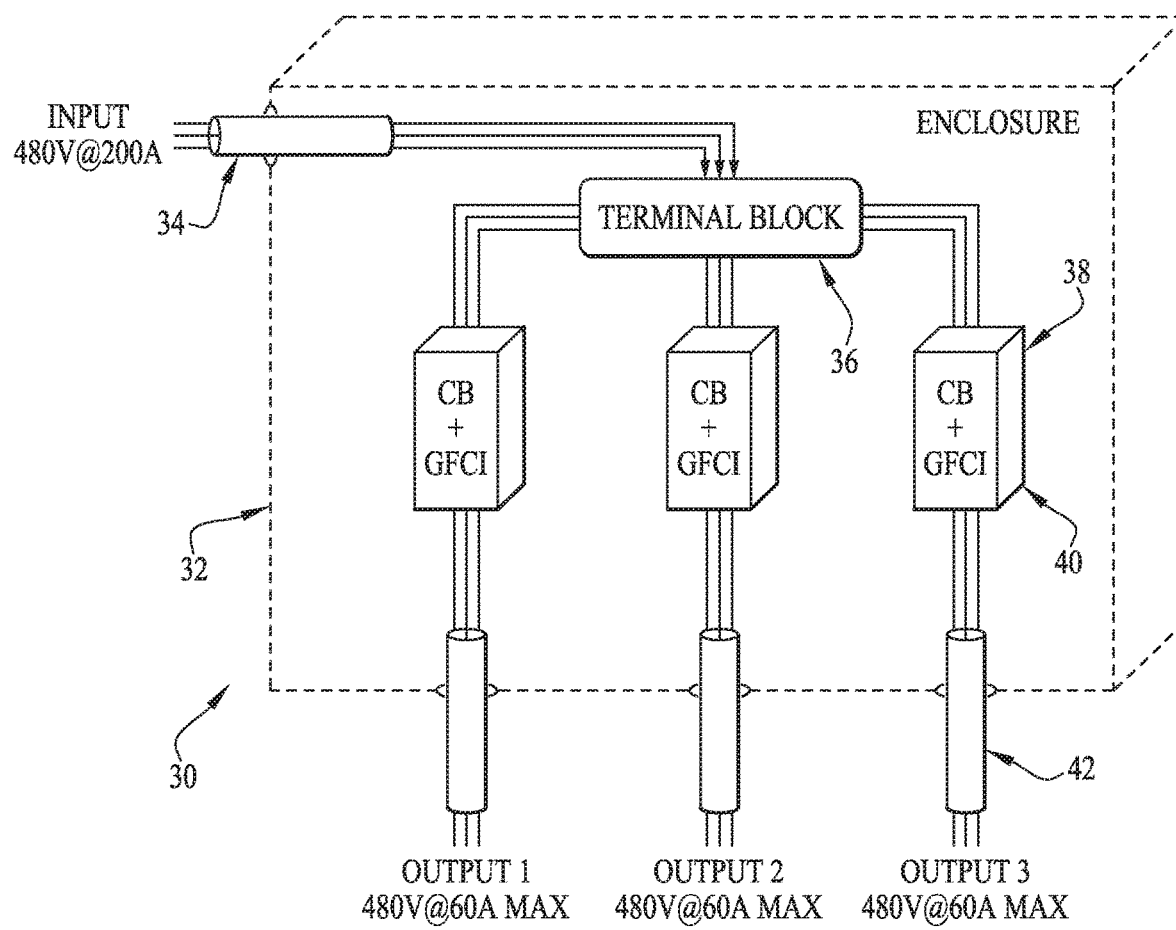
FIG. 3 is a perspective view of the power cabinet of FIG. 1 with its front panel removed to reveal the internal components.

Turning now to the drawings, FIGS. 1-3 show an industrial-voltage power distribution and protection cabinet 30 according to an example embodiment of the invention. The power cabinet 30 is shown in use with a three-phase 480 VAC, 180 A portable generator 10 and three individual three-phase 480 VAC portable hydro-blasting machines 20. The portable generator 10 and the hydro-blasting machines 20 can be of a conventional type and are not described in detail for brevity.

The power cabinet 30 includes an enclosure 32, an input cable 34, an electrical junction element 36, a plurality of circuit breakers (CBs) 38, a plurality of ground-fault circuit interrupters (GFCIs) 40, and a plurality of output cables 42. All of these components of the cabinet are rated for operation at industrial voltages (i.e., secondary distribution voltages) for example three-phase 480 VAC. All the components outside the enclosure 32 are typically rated NEMA3R, and all the electrical components inside the enclosure 32 are typically UL listed (according to their manufacturer's specifications).

The enclosure 32 is sized for safely housing the junction 36, the CBs 38, the GFCIs 40, and the internal end portions of the input cable 34 and the output cables 42. As such, a single (one, and only one) enclosure 32 houses all of the distribution and protection components for operating multiple industrial machines 20 at the same time. Also, the enclosure 32 is industrial grade, for example UL 508 certified and NEMA 3R, 4, or 12 rated, fully insulated and resistant to shock, impact, and corrosion, for use in outdoor applications.

The input cable 34 is a length of conventional power cable, for example 480 VAC, 180 A, three-phase, four-wire, insulated cable. The input cable 34 is electrically connected to the junction 36 at its internal end, extends through a sealed opening in the enclosure 32, and electrically connects to the portable generator 10 (for example, directly by hardwiring its external end as shown in FIG. 2 or indirectly via an external connector at its external end). In embodiments including a cable connector, it can be of a conventional type selected for easy electrical connection to and disconnection from the portable generator 10, for example an IP67 connector or another universal power cable connector that connects to most types of common industrial cable connectors for these types of generators. As such, a single (one, and only one) input cable 34 connects to the portable generator 10 for delivering power to and protecting multiple industrial machines 20 being used at the same time.

The junction 36 is located inside the enclosure 32, has the input cable 34 electrically connected to it to receive power from the generator 10, and is electrically connected to the CBs 38 and the GFCIs 40. As such, the junction 36 receives power from the single input cable 34 connected to the portable generator 10 and distributes that power for use by multiple industrial machines 20 at the same time. The junction 36 can be provided for example by a conventional terminal block to which the input cable 34 and the CBs 38 and GFCIs 40 are conventionally connected, with design calculations for UL certification and sufficient insulation between phase connections.

The CBs 38 and the GFCIs 40 are located inside the enclosure 32 and selected for the levels of protection appropriate for the machines 20 to be used (e.g., 60 A CBs). The CBs 38 and the GFCIs 40 can be provided for example by a conventional protection equipment for example as is commercially available from Eaton Corporation (Cleveland, Ohio). In typical embodiments, each pair of the CBs 38 and the GFCIs 40 is provided as an integral component (see FIG. 3), though in some embodiments they are separate components electrically connected together. And in typical embodiments, the CBs 38 and GFCIs 40 are electrically connected to the junction 36 by conventional cabling (see FIG. 3), though in some embodiments these components are provided as an integral unit directly connected together or they are connected by other conventional electrical-conductive elements. The depicted embodiment includes three CBs 38 and three GFCIs 40 for protecting three industrial machines 20 being used at the same time, though in other embodiments two or more than three CBs 38 and GFCIs 40 can be provided. As such, the multiple CBs 38 and GCIs 40 in the single enclosure 32 protect the multiple machines 20 being used at the same time. Also, the CBs can be mounted under a hinged window of the enclosure 32 for easy access and enhanced safety. In other embodiments, additional or substitute electrical protection components of a type known to those of ordinary skill in the art can be selected and included in the cabinet 30.

In addition, the CBs 38 are mechanically connected to manual-operation on/off switch handles 44 that are repositionable between "on" (open) and "off" (closed) positions corresponding to on and off CB switch positions, with each control handle operationally connected to a respective one of the CBs 38 for individual operation. Each switch handle 44 can be manually repositioned to turn the power to the individual respective machine 20 on or off for normal use, as well as to reset the power back on after the respective CB 38 has tripped open (which automatically repositions the respective handle 44 from on to off position). Each handle 44 extends through a panel of the enclosure 32 so that it can be individually operated between positions without opening the enclosure 32. The switch handles 44 can be of a conventional type for example NEMA 3R rated. The handles 44 can each include a lock element that engages a cooperating lock element of one of the panels of the enclosure 32 to securely lock the handles 44 (and thus the connected CB 38) in the on or off position for safety.

The output cables 42 are each a length of conventional power cable, for example 480 VAC, 60 A, three-phase, four-wire, insulated cable. Each of the output cables 42 is electrically connected to a respective one of the CBs 38 and GFCIs 40 at its internal end, extends through a respective sealed opening in the enclosure 32, and includes a respective external connector 46 at its external end. The cable connectors 46 can be of a conventional type selected for easy electrical connection to and disconnection from the industrial machines 20, for example an IP67 connector or another universal power cable connector that connects to most types of common industrial cable connectors for these types of machines. The depicted embodiment includes three output cables 42 for distributing power to three industrial machines 20 being used at the same time, though in other embodiment two or more than three output cables 42 can be provided (with the number of output cables 42 matched to the number of CBs 38 and GFCIs 40). Because there are multiple output cables 42 distributing the power from the single input cable 34, the multiple output cables 42 can have a lower maximum current rating (e.g., 60 A) than the single input cable (e.g., 180 A), with the output cable maximum current rating being no more than the input cable maximum current rating divided by the number of the multiple output cables.

In this way, the power distribution and protection cabinet 30 divides and distributes power (e.g., 480 VAC, 180 A, three-phase, three-pole, four-wire) into three (or another plural number of) sets of power service (e.g., 480 VAC, 60 A). In addition, the cabinet 30 protects the output with a CB (e.g., 60 A) and a GFCI. Furthermore, the cabinet 30 provides for monitoring the status (voltage, current, etc.) of the incoming power lines and opening the circuit on a fault condition. Because of the unique design of the cabinet 30, it provides for ease of installation as well as less and easier maintenance. And the cabinet 30 can provide material/equipment cost savings of up to about 40 percent compared to the conventional approach of using three individual circuit-breaker boxes with each being cabled back to the generator.

Design considerations for the power distribution and protection cabinet 30 can include providing a high level of efficiency by selecting the components to work with a load of about 70 percent to about 80 percent of the maximum power output (under sizing can cause malfunctions, while oversizing can result in excess costs). Also, the cabinet 30 can be design to provide sufficient transmission capacity under normal operating conditions as well as in fault conditions. The cabinet 30 can be built with the latest and most-advanced component parts available on the market, with a high-accuracy fault detection module.

Technical specifications of an example of the power distribution and protection cabinet 30 are provided in Table A:

TABLE A

| | |
|---|---|
| Rating | 180 A, 3-phase (L1, L2, L3, G), 3-pole, 4-wire, 480 VAC |
| Environmental Rating | NEMA 3R weather resistant |
| Input | 480 VAC @ 180 A with 2/0 4 C Type W portable power cable |
| Output | 3 sets of 60 A 3-phase 480 VAC receptacle |
| Overcurrent protection | 60 A circuit breaker on each output - UL Listed |
| Fault protector | Ground fault protector/earth leakage protector for Series G E-Frame circuit breakers - UL listed |
| Overall dimensions | 30 inches × 30 inches × 8 inches |
| Weight | 190 lbs |

All these technical specifications, as well as all those shown in the drawings, are representative for example/illustration purposes only and are not limiting of the invention.

In another embodiment, the industrial-voltage power distribution and protection cabinet includes features for portability. For example, in some embodiments the cabinet includes wheels (e.g., tires, rollers, or casters) mounted to the enclosure, in some embodiments the cabinet includes a handle (e.g., a looped or T-shaped bar for manually pushing/pulling for repositioning the cabinet) mounted to the enclosure, and in some embodiments the cabinet includes an integral cart (e.g., with wheels and a handle. Other embodiments of the invention include wall mounts for mounting the cabinet to a wall for example of a temporary panel or a permanent building structure.

For example, in the depicted embodiment power cabinet 30 is mounted to a portable cart 50 that enables the cabinet 30 to be moved to remote locations for use and moved around as needed at the remote site for outdoor use. The cart 50 is designed for outdoor use and includes a frame 52 that supports the cabinet 30 during use, for example it can be made of steel frame members. And the cart 50 includes a plurality (e.g., four) wheels 54 each mounted to the frame 52 that support the cabinet 30 and cart frame 52 during use and enable rolling the cabinet 30 on rough ground at remote outdoor locations. For example, the wheels 54 can be of a rugged, large-diameter type for use on sandy, rocky, gravel, or grassy terrain that is uneven and in a condition commonly found on construction and industrial sites. Also, the cart 50 can have a cabinet-mounting feature 56 (for example, a top panel, a top peripheral frame, frame members with mounting brackets, etc.) that supports the cabinet 30 at an angle from horizontal (for example, about 30 degrees) for stability and ease of use.

In another aspect, the invention relates to a system of industrial-voltage components including the portable power supply 10, a number of machines 20, and a power distribution and protection cabinet 30 for distributing power from the power supply to the machines and at the same time protecting the machines from irregularities in the power supplied.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the specific sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A power distribution and protection cabinet for use with a power supply and multiple electric-powered machines, the power cabinet comprising:
   a single outdoor-rated enclosure;
   an input cable that extends through a sealed opening in the single enclosure;
   distribution and protection components comprising:
      a junction that is located inside the single enclosure and to which an internal end of the input cable is electrically connected; and
      a plurality of circuit breakers (CBs) and a plurality of ground-fault circuit interrupters (GFCIs) that are located inside the single enclosure and that are electrically connected to the junction, with the CBs and the GFCIs arranged in pairs in series; and
   a plurality of output cables each of which is electrically connected to a respective serial pair of the CBs and GFCIs serial pairs at a respective internal end of each of the output cables, extends through a respective sealed opening in the single enclosure, and includes a respective external connector at a respective external end of each of the output cables for electrical connection to a respective one of the machines,
   wherein the single enclosure houses all of the distribution and protection components for operating the multiple machines simultaneously, the single input cable connects to the power supply for delivering power to the multiple machines being used simultaneously, the junction receives power from the single input cable and distributes that power for use by the multiple machines simultaneously, the plurality of CBs and the plurality of GCIs in the single enclosure electrically protect the multiple machines being used simultaneously, and the plurality of output cables deliver the distributed power to the multiple machines.

2. The power cabinet of claim 1, wherein the plurality of CBs, the plurality of GFCIs, and the plurality of output cables comprise three CBs, three GFCIs, and three output cables, respectively.

3. The power cabinet of claim 1, wherein the plurality of output cables comprises a number of output cables, wherein each of the output cables has a lower maximum current rating than a maximum current rating of the input cable, and wherein the maximum current rating of each of the output cables is no more than the maximum current rating of the input cable divided by the number of the output cables.

4. The power cabinet of claim 1, wherein the power supply is a three-phase portable generator, the multiple electric-powered machines are three-phase machines, and the CBs, the GFCIs, the input cable, and the output cables are three-phase components.

5. The power cabinet of claim 1, wherein the junction is a terminal block.

6. The power cabinet of claim 1, further comprising multiple manual switch handles with each one mechanically connected to a respective one of the CBs and extending to an exterior of the single enclosure to enable manual individual repositioning of the CBs between on and off positions without opening the single enclosure.

7. The power cabinet of claim 1, further comprising a portable cart to which the single enclosure is mounted.

8. The power cabinet of claim 7, wherein the portable cart includes a plurality of wheels selected for outdoor use on uneven terrain at remote construction and industrial sites.

9. The power cabinet of claim 1, wherein the power cabinet is designed for use with the power supply, the power supply being a three-phase, 480 VAC, 180 A portable generator.

10. The power cabinet of claim 9, wherein the input cable is provided by 480 VAC, 180 A, three-phase, three-pole, four-wire cable.

11. The power cabinet of claim 1, wherein the power cabinet is designed for use with the multiple electric-powered machines, each of the multiple electric-powered machines being three-phase, 480 VAC, 60 A industrial machinery for construction and/or maintenance.

12. The power cabinet of claim 11, wherein the electric-powered machines are selected from a group consisting of hydro-blasting, welding, dust-collector, and fast-blaster equipment.

13. The power cabinet of claim 11, wherein each of the output cables is provided by 480 VAC, 60 A, three-phase, three-pole, four-wire cable.

14. The power cabinet of claim 11, wherein each respective external connector is of a universal type.

15. An industrial construction and maintenance system, comprising a single one of the power supply, a single one of the power cabinet, and the multiple electric-powered machines of claim 1 all electrically connected together for use.

16. A three-phase 480 VAC power distribution and protection cabinet for use with a three-phase 480 VAC portable generator and multiple three-phase 480 VAC electric-powered machines, the power cabinet comprising:
 a single outdoor rated enclosure;
 a three-phase 480 VAC input cable that extends through a sealed opening in the single enclosure;
 distribution and protection components comprising:
  a junction that is located inside the single enclosure and to which an internal end of the input cable is electrically connected; and
  a plurality of three-phase 480 VAC circuit breakers (CBs) and a plurality of three-phase 480 VAC ground-fault circuit interrupters (GFCIs) that are located inside the single enclosure and that are electrically connected to the junction, with the CBs and the GFCIs arranged in pairs in series;
 a plurality of three-phase 480 VAC output cables each of which is electrically connected to a respective serial pair of the CBs and GFCIs serial pairs at a respective internal end of each of the output cables, extends through a respective sealed opening in the single enclosure, and includes a respective external connector at a respective external end of each of the output cables for electrical connection to a respective one of the machines; and
 a portable cart to which the enclosure is mounted, wherein the portable cart includes a plurality of wheels selected for outdoor use on uneven terrain at remote construction and industrial sites,
 wherein the single enclosure houses all of the distribution and protection components for operating the multiple machines simultaneously, the single input cable connects to the portable generator for delivering power to the multiple machines being used simultaneously, the junction receives power from the single input cable and distributes that power for use by the multiple machines simultaneously, the plurality of CBs and the plurality of GCIs in the single enclosure electrically protect the multiple machines being used simultaneously, and the plurality of output cables deliver the distributed power to the multiple machines, and
 wherein each of the output cables has a lower maximum current rating than a maximum current rating of the input cable, the plurality of output cables comprises a number of output cables, and the maximum current rating of each of the output cables is no more than the maximum current rating of the input cable divided by the number of the output cables.

17. The power cabinet of claim 16, further comprising multiple manual switch handles with each one mechanically connected to a respective one of the CBs and extending to an exterior of the single enclosure to enable manual individual repositioning of the CBs between on and off positions without opening the single enclosure.

18. The power cabinet of claim 16, wherein the input cable is rated at 180 A and each of the output cables is each rated at 60 A.

19. The power cabinet of claim 16, wherein the multiple electric-powered machines are selected from a group consisting of hydro-blasting, welding, dust-collector, and fast-blaster equipment.

20. An industrial construction and maintenance system, comprising a single one of the power supply, a single one of the power cabinet, and the multiple electric-powered machines of claim 16 all electrically connected together for use.

* * * * *